BEST AVAILABLE COPY

June 21, 1938. W. G. H. FINCH Re. 20,767

Orig. 2,061,457

IMAGE BROADCASTING SYSTEM

Original Filed Dec. 24, 1934 2 Sheets-Sheet 1 electrochemical or (Modification on (thermochemic

INVENTOR.
William G. H. Finch
BY
Samuel Ostrolenk
ATTORNEY.

78 TELEGRAPHY

EXAMINER

BEST AVAILABLE COPY

June 21, 1938. W. G. H. FINCH Re. 20,767

IMAGE BROADCASTING SYSTEM

Original Filed Dec. 24, 1934 2 Sheets-Sheet 2

Invention I
Printing by
Dotting

INVENTOR
William G. H. Finch
BY
Samuel Ostrolenk
ATTORNEY

78 TELEGRAPHY
EXAMINER

Reissued June 21, 1938

Re. 20,767

UNITED STATES PATENT OFFICE 20,767

IMAGE BROADCASTING SYSTEM

William G. H. Finch, Spuyten Duyvil, N. Y.

Original No. 2,061,457, dated November 17, 1936, Serial No. 759,011, December 24, 1934. Application for reissue April 30, 1938, Serial No. 205,280

17 Claims. (Cl. 178—11)

My invention relates to novel apparatus for and methods of signaling and more particularly relates to novel apparatus for and methods of facsimile broadcasting embodying systems such as disclosed in my application, for Image broadcasting systems, Serial No. 717,304, which matured into Patent No. 1,985,654 on December 25, 1934, of which this application is a continuation in part.

In the application of facsimile for home reception of a broadcast program, it is desirable not only to employ simple, inexpensive, easily operable apparatus requiring the minimum of attention and adjustments, but also to further reduce the cost of the mechanism to a minimum by making all possible use of the radio receiver already available in the home of a user.

Inasmuch as the ordinary home, and particularly where such a facsimile would be used, is already equipped with a radio receiver, it is desirable that this radio receiver be employed for the reception of the broadcast signals, but this is ordinarily impractical due to the fact that the mechanism employed for operating the facsimile heretofore used does not readily lend itself for operation from the standard radio receiver. In accordance with my invention, I contemplate employing a novel construction of a facsimile receiver which will readily operate from the output of the standard home receiver.

Accordingly, an object of my invention is to provide a novel facsimile receiver.

A further object is to provide a novel facsimile receiver operable from the standard home radio receiver.

Still another object of my invention is to provide a novel arrangement whereby the same mechanism which operates the loudspeaker of a standard home receiver may also be employed for operating the facsimile receiver.

There are other objects which, together with the foregoing, will appear in the detailed description of the invention in connection with the drawings which are to follow, in which.

Figures 1, 4, 5:
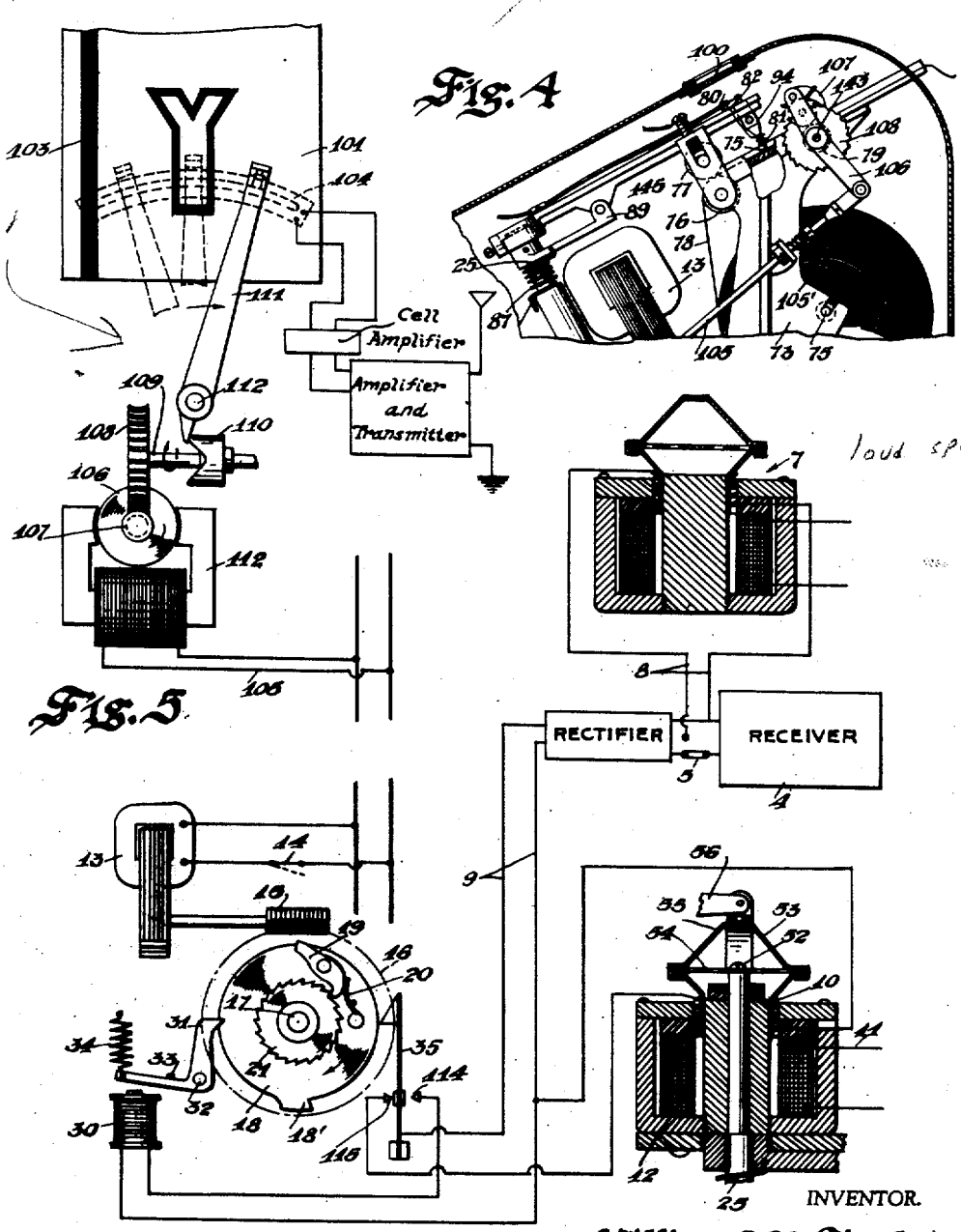
Figure 1 is a circuit diagram of a preferred form of my invention.
Figure 4 is a modified form of facsimile receiver employing an electro-chemical method of reception.
Figure 5 is a schematic illustration of one form of transmitter which I may use in carrying out my invention.

Referring now more specifically to Figure 1, signals received over the antenna 3 are impressed upon the receiver 4 and thence transmitted over switch 5 to either the facsimile apparatus shown at 6 or to the loudspeaker unit shown at 7 connected to the terminals 8. With the switch 5 in the position shown, the received signals are conducted along the leads 9 to the movable coil 10 of the electro-dynamic motor 11. The electro-dynamic motor 11 comprises in addition to the movable coil 10 a fixed coil 12 energized by direct current available from any standard radio receiver. The movable coil 10 is connected to an oscillating stylus in a manner to be described in detail in connection with Figures 2 and 3.

The stylus is oscillated by energy received from a synchronous single phase motor 13 set into operation by closing the local circuit switch 14. This motor is preferably driven from a source of alternating current tied into the system supplying power to the motor which drives the transmitter of the same facsimile system. The motors of the transmitter and receiver are thus driven in substantial synchronism.

To the armature of motor 13 there is secured a worm 15 suitably mounted in bearings and meshing with the gears 16 secured to shaft 17. In this manner the shaft 17 is driven in the direction indicated by the arrow. The synchronous disc 18, free to rotate about the shaft 17, is located so that a pawl 19 operated under the action of spring 20 normally engages ratchet wheel 21 which is secured to and rotates with the shaft 17.

Upon the hollow shaft 22 is secured a cam 23 shaped substantially like the cam shown in detail in my parent application described above. The cam 23 actuates a cam follower 24 pivoted on the shaft 25 through which it oscillates the stylus which will be described hereinafter in detail in connection with Figure 2.

Synchronization and the maintenance of proper phase relation is accomplished by means of the synchronization slow to energize magnet 30 which actuates the armature and pawl 31 pivoted at 32 and held against a stop 33 by tension of the spring 34 when the magnet is de-energized. The switch arm 35 is actuated by a projection on the periphery of synchronization disc 18 and is capable of closing its right or left-hand contact, thus switching the incoming signal from the visual signal responsive movable coil windings 10 to the synchronization magnet 30 and vice versa according to the position in which arm 35 is located at the time.

Assuming that the transmitter is in motion and is scanning the picture as shown in my parent application, periodic synchronizing impulses of a special character, i. e., extra long impulses will be transmitted for synchronization purposes. If the receiver mechanism is in a position corresponding to the position of the transmitter scanner at the instant when the synchronization impulse is received, the magnet 30 will be energized due to the fact that in this position of the receiver the switch 35 has been rocked to engage its right-hand contact, completing the energizing circuit for the synchronization magnet 30. Energization of the magnet 30 will operate its armature about the pivot 32, removing the tooth of the pawl 31 from the path of the pawl 19 so that the latter will not disengage the ratchet 21 and the motor will continue to drive the shaft 17. In the event, however, that the receiver is not in synchronism at the time that the synchronizing impulse is being received, the switch arm 35 will be in the position shown. No energizing current will be transmitted to the magnet 30 and accordingly the tooth of the pawl 31 will rock the pawl 19 about its pivot in a counterclockwise direction so that its tooth disengages the ratchet 21 and the motor 13 will be disconnected from the shaft 17, thus bringing the stylus to a stop.

Figure 2:
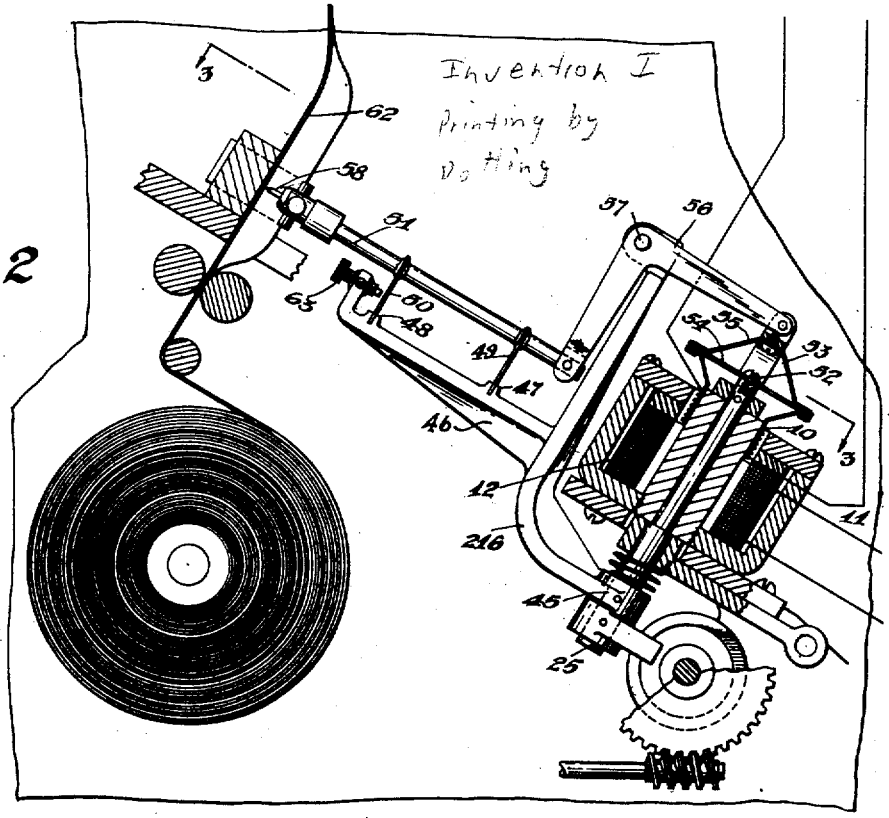
Figure 2 is a schematic illustration, partly in cross-section of the details of my facsimile receiver.
Figure 3:
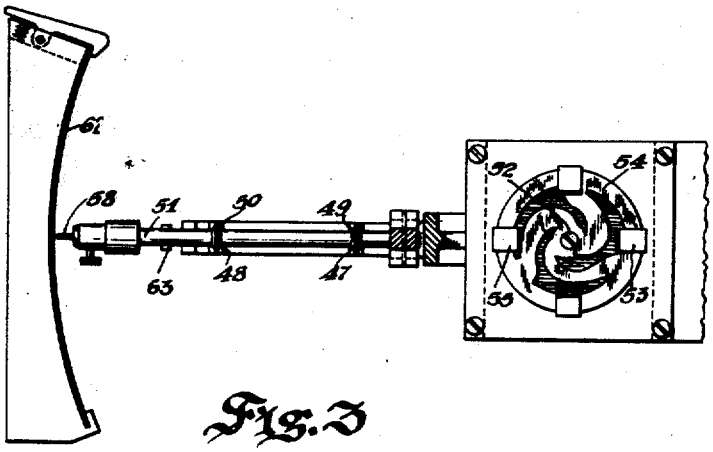
Figure 3 is a top view of Figure 2 taken at 3—3.

Referring now more specifically to Figure 2 where I have shown the details of my preferred form of recorder, the shaft 25 oscillating in bearings 45 carries at one end an arm 46. Anchored at arm 46 by suitable means at points 47 and 48 are two resilient stylus supports 49 and 50 in flexible connection with the stylus 51. As the shaft is oscillated, the arm 46 rocks back and forth carrying with it the stylus arm 51 which moves in an arc, as shown in Figure 3.

The oscillatory movement of shaft 25 is also transmitted to the moving coil 10 of the electro-dynamic motor 11, having windings 17.

Moving coil 10 is securely fastened to the oscillating shaft 25 by a screw 52 which holds the coil in place. However, it permits coil 10 to move up and down in response to received signals, due to the resilient membrane 53, so shaped as to obtain the motion of the coil 10. This motion by means of a spider frame 55, is transmitted to the bell crank 56, pivoted at 57. The bell crank 57 is at one end secured to the stylus 51, carrying at its extremity the pointer 58.

The winding of coil 12 is energized by the direct continuous current available in the ordinary radio receiver. The moving coils 10 are connected to the output of the last tube. When now a signal is received causing the moving coil 10 to oscillate in and out of the magnetic field of coil 12, it will cause stylus 51 to oscillate in such a manner as to come in contact with the paper 62 and produce an image similar to the one transmitted, with any of the methods previously described. To limit the motion of the stylus 51, I have provided the screw adjustment 63, which prevents stylus 51 from digging into the paper 62 as the picture is being recorded.

Referring again to Figure 1, it will be noted that the electro-dynamic unit 7 connected to the lead 8 is substantially identical in construction with that of the unit which operates the stylus of the facsimile apparatus, except that in the former case the electro-dynamic unit is employed to operate the diaphragm for generating audible signals, whereas in the facsimile case a similar unit operates the stylus of a facsimile receiver. Inasmuch as the windings of the dynamic unit in both cases are alike, they can be readily operated from the output of the same radio receiver.

In fact, in accordance with one form of my invention, I contemplate employing the same electro-dynamic unit to operate either the diaphragm of a loudspeaker or the stylus by an arrangement for mechanically disconnecting one and connecting the other to be operated by the same movable coil 10.

Referring now to Figure 4, I have shown another modification of my invention in which the stylus is substituted by a pointer 75 constantly lightly bearing upon a specially treated paper 78.

The pointer 75 is electrically insulated from the machine by suitable means and is connected to one side of the circuit while the other is grounded to the frame of the machine.

Paper impregnated with a solution of various salts has the property of discoloring when interposed between two differing polarities of an electrical circuit and I use this principle to record images by utilizing a paper so treated and interpose it between the pointer 75 and frame 79.

The remaining apparatus, including the shaft which oscillates the pointer, the motor drive, the guide rolls, the paper feed mechanism, being exactly the same as that described in my parent case, is here shown schematically.

In an alternative arrangement for operating the chemical recorder, I may conduct the current from the lead 80 through the heating coil 81, thence back over the lead 82 shown in dotted lines. Current passing through the heating coil 81 will then generate sufficient heat to produce a chemical action on the chemically treated paper recording sheet.

Referring to Figure 5, I have shown a developed positive film or similar band which I may use at the transmitter. The band 101 moves in the direction of the arrow at a predetermined speed controlled by synchronous single phase motor 102 in a manner to be described hereinafter. Motor 102 may be driven from a standard source such as a sixty or twenty-five cycle line. Upon film 101, the image to be transmitted appears in black and for purposes of illustration, I have shown on Figure 5 an enlarged letter Y drawn in the middle of band 101. In this case, the letter Y is to be transmitted. On one side of the film 101, a relatively wide black line is drawn, which is shown at 103 in Figure 5, for synchronizing purposes as explained in my parent case.

Behind the picture bearing transparent band 101, a photo-electric cell 104, shaped as a section of an arc, is suitably mounted and connected to a suitable amplifier which in turn is connected to the transmitter for transmitting signals. The transmitter for radio broadcasting may be an oscillator of carrier frequencies modulated by the picture currents generated by the photo-electric cell as the image to be transmitted is scanned in a manner to be described hereinafter. For wire transmission, a similar arrangement or just an impulse transmitter may be used.

When the single phase motor 102 is set in motion by closing switch 105, its armature 106 revolves in the direction shown by the arrow and the worm mounted at 107 on the armature shaft meshes with and drives worm gear 108. Gear 108 is mounted on and rotates shaft 109 in the direction of the arrow.

Shaft 109 carries secured thereto a cam 110 which, in revolving, controls cam follower 152', carrying an image scanning device 111, pivoted at 112, to oscillate. Cam follower 152' is held against cam 110 by a spring 153 so that as shaft 109 rotates, arm 111 is swept back and forth over and scans the photograph appearing on band 101.

For purposes of simplicity, the mechanism which steps the photographic band 101 forward

178 TELEGRAPHY
EXAMINER is not shown in this figure, but at the completion of each cycle of scanning arm 111, the picture containing film is fed forward a predetermined amount, depending upon the quality of the picture desired, so that on each swing of arm 111, a new line of image points is scanned. All of this has been shown and described in greater detail in my parent case. It will now be clear that as motor 102 rotates, arm 111 oscillates in a sweeping movement back and forth over the picture to be transmitted and at the completion of every oscillation, a different line of the picture to be transmitted is scanned.

A suitable lighting system comprising a source of light of constant intensity, an objective lens and a reflector, capable of bending the light beam 90 degrees, is focussed through the picture upon the photoelectric cell 104. It will be clear that whenever a dark or black portion of the image to be transmitted interposes the light beam between its source and the photoelectric cell 104, a variation in the current generated by the photoelectric cell in its circuit occurs. In the case of black and white transmission, only two current variations are produced. For transmitting shades between black and white a corresponding number of current variations result. In half tone transmission it would be necessary to break up the picture into sections in the manner well known in the art.

When these current variations are amplified and applied to the transmitting equipment, they will be radiated through the air or transmitted by wire to the receiving circuit and related apparatus shown diagrammatically in Figure 1.

Although I have disclosed specific illustrations of carrying out my invention, it will be understood that it may take on other forms than that herein shown. I do not intend to be limited by the examples here given, but only as set forth in the appended claims.

I claim:

1. In a picture transmitting system; a receiver comprising a pivoted scanner arm; a pointer mounted thereon; a heater coil surrounding said pointer and having circuit connections carried on said scanner arm; a rod on which said scanner arm is mounted; a cam follower secured to said rod; a cam with which said cam follower is held in engagement; a source of power for driving said cam; a record sheet on which a record is to be made; and a platen for said paper.

2. In a picture transmitting system; a receiver comprising a pivoted scanner arm; a pointer mounted thereon; a heater coil surrounding said pointer and having circuit connections carried on said scanner arm; a rod on which said scanner arm is mounted; a cam follower secured to said rod; a cam with which said cam follower is held in engagement; a source of power for driving said cam; a record sheet on which a record is to be made; means whereby power from said source of power is transmitted to feed said record sheet line by line past said pointer for each oscillation of said pivoted scanner arm; and a platen for said paper.

3. In a facsimile system operable on a continuous record sheet; a stylus; means for oscillating said stylus across said sheet; means for contacting said stylus against said sheet; means for heating said stylus comprising an electric heater coil; and means for advancing said record sheet line by line past said stylus at each oscillation thereof; said record sheet being curved to correspond to the oscillation path of said stylus, and being sensitive to heated impressions of the stylus for making a visible record to compose a facsimile of the transmitted image.

4. In a facsimile system operable on a continuous record sheet; a stylus; means for oscillating said stylus across said sheet comprising a scanner arm attached to said stylus, a bracket resiliently carrying said arm, a cam surface rotatable in synchronism with the transmitter, and a cam follower connected to said bracket and coacting with said cam surface; and means for reciprocating said stylus against said sheet in response to received picture signals; said record sheet being marked by said stylus in accordance with the marking excursions thereof.

5. In a facsimile system operable on a continuous record sheet; a stylus; means for oscillating said stylus across said sheet comprising a scanner arm attached to said stylus, a bracket resiliently carrying said arm, a cam surface rotatable in synchronism with the transmitter, and a cam follower connected to said bracket and coacting with said cam surface; means for reciprocating said stylus against said sheet in response to received picture signals; and means for advancing said record sheet line by line past said stylus at each oscillation thereof; said record sheet being curved to correspond to the oscillation path of said stylus, and being marked by said stylus in accordance with the marking excursions thereof to compose a facsimile of the transmitted image.

6. In a facsimile system operable on a continuous record sheet; a stylus; means for oscillating said stylus across said sheet comprising a scanner arm attached to said stylus, a bracket resiliently carrying said arm, a cam surface rotatable in synchronism with the transmitter, and a cam follower connected to said bracket and coacting with said cam surface; means for reciprocating said stylus against said sheet in response to received signals; means for advancing said record sheet line by line past said stylus at each oscillation thereof; said record sheet being sensitive to impressions of the stylus for making a visible record of the marking excursions of said stylus against said sheet to compose a facsimile of the transmitted image.

7. In a facsimile system operable on a continuous record sheet; a stylus; means for oscillating said stylus across said sheet comprising a scanner arm attached to said stylus, a rod carrying said arm, a cam surface rotatable in synchronism with the transmitter, and a cam follower connected to said rod for coacting with said cam surface, said stylus constantly bearing against said sheet during recording; and means for advancing said record sheet line by line past said stylus at each oscillation thereof; said record sheet being chemically treated for being discolored in response to electrical current flow and a source of signal energy connected between said stylus and said record sheet for making a visible record on said sheet to compose a facsimile of the transmitted image.

8. In a facsimile system operable on a continuous record sheet; a stylus; means for oscillating said stylus across said sheet comprising a scanner arm attached to said stylus; means for reciprocating said stylus against said sheet in response to received signals comprising an electrodynamic unit having a stationary magnetizing solenoid, a circular air gap, and a movable coil suspended in said circular air gap electrically responsive to the signals and movable in accordance with said signals, and a mechanical connection between said movable coil and said scanner arm; and means for advancing said record sheet line by line past said stylus at each oscillation thereof; said record sheet being marked by said stylus in accordance with the marking excursions thereof to compose a facsimile of the transmitted image.

9. In a facsimile system operable on a continuous record sheet: a stylus; means for oscillating said stylus across said sheet comprising a scanner arm attached to said stylus; means for reciprocating said stylus against said sheet in response to received signals comprising an electrodynamic unit having a stationary magnetizing solenoid, a circular air gap, and a movable coil suspended in said circular air gap electrically responsive to the signals and movable in accordance with said signals, and a mechanical connection between said movable coil and said scanner arm, and a rod extending axially through said electrodynamic unit and circular air gap, said movable coil being supported on said rod; and means for advancing said record sheet line by line past said stylus at each oscillation thereof; said record sheet being curved to correspond to the oscillation path of said stylus, and being marked by said stylus in accordance with the marking excursions thereof to compose a facsimile of the transmitted image.

10. In a facsimile system operable on a continuous record sheet: a stylus; means for oscillating said stylus across said sheet comprising a scanner arm attached to said stylus; means for reciprocating said stylus against said sheet in response to received signals comprising an electrodynamic unit having a stationary magnetizing solenoid, a circular air gap, a movable coil suspended in said circular air gap electrically responsive to the signals and movable in accordance with said signals, a mechanical connection between said movable coil and said scanner arm, and a rod extending axially through said electrodynamic unit and circular air gap, said movable coil being supported on said rod; and means for advancing said record sheet line by line past said stylus at each oscillation thereof; said record sheet being sensitive to impressions of said stylus for making a visible record of the marking excursions of said stylus against said sheet to compose a facsimile of the transmitted image.

11. In a facsimile system operable on a record sheet: a stylus; means for oscillating said stylus across said sheet comprising a scanner arm attached to said stylus; means for reciprocating said stylus against said sheet in response to received signals comprising an electrodynamic unit having a stationary magnetizing solenoid, a circular air gap, a movable coil suspended in said circular air gap electrically connected to the signals and movable in accordance with said signals, a mechanical connection between said movable coil and said scanner arm, and a rod extending axially through said electrodynamic unit and circular air gap, said movable coil being supported on said rod.

12. In a facsimile system operable on a continuous record sheet: a stylus; means for oscillating said stylus across said sheet comprising a scanner arm attached to said stylus, a bracket compliantly carrying said arm, a cam surface rotatable in synchronism with the transmitter and a cam follower connected to said bracket and coacting with said cam surface; means for reciprocating said stylus against said sheet in response to received signals comprising an electrodynamic unit having a stationary magnetizing solenoid, a circular air gap, a movable coil suspended in said circular air gap electrically connected to the signals and movable in accordance with said signals, a mechanical connection between said movable coil and said scanner arm, and a rod extending axially through said electrodynamic unit and circular air gap, said movable coil being supported on said rod; and means for advancing said record sheet line by line past said stylus at each oscillation thereof; said record sheet being marked by said stylus in accordance with the marking excursions thereof to compose a facsimile of the transmitted image.

13. In a facsimile system operable on a continuous record sheet: a stylus; means for oscillating said stylus across said sheet comprising a scanner arm attached to said stylus, a rod carrying said arm, a cam surface rotatable in synchronism with the transmitter, and a cam follower connected to said rod for coacting with said cam surface; and means for holding the record sheet substantially perpendicular to the oscillation path of said stylus and curved in an arc.

14. In a facsimile system operable on a continuous record sheet: a stylus; means for oscillating said stylus across said sheet comprising a scanner arm attached to said stylus, a rod carrying said arm, a cam surface rotatable in synchronism with the transmitter, and a cam follower connected to said rod for coacting with said cam surface; and means for holding the record sheet curved in an arc about said stylus with a radius substantially that described by the stylus.

15. In a facsimile system operable on a continuous record sheet: a stylus; means for oscillating said stylus across said sheet comprising a scanner arm attached to said stylus; and means for holding the record sheet curved in an arc about said stylus with a radius substantially that described by the stylus, said stylus being arranged to mark the inside arced surface of the sheet.

16. In a facsimile system operable on a record sheet: a scanner; means for oscillating said scanner; and means for holding the record sheet in a position substantially perpendicular to the oscillation path of said scanner and curved in an arc about said scanner with a radius substantially that described by the scanner whereby the record sheet coacts with the oscillated scanner in a substantially linear marking path on the sheet.

17. In a facsimile system operable on a continuous record sheet: a stylus; means for oscillating said stylus across said sheet comprising a scanner arm attached to said stylus; and means for holding the record sheet in a position substantially perpendicular to all positions of said stylus and curved in an arc about said stylus with a radius substantially that described by the stylus, said stylus being arranged to mark the inside arced surface of the sheet, whereby the record sheet coacts with the oscillated stylus in a substantially perpendicular relation and in a straight line marking path on the sheet to compose a facsimile of the transmitted image.

WILLIAM G. H. FINCH.